US012669517B2

(12) United States Patent
Hoffmeyer et al.

(10) Patent No.: US 12,669,517 B2
(45) Date of Patent: Jun. 30, 2026

(54) IDENTIFICATION OF SAMPLE CELLS IN A CHROMATOGRAPHY AUTOSAMPLER

(71) Applicants: DIONEX CORPORATION, Sunnyvale, CA (US); DIONEX SOFTRON GMBH, Gemering (DE)

(72) Inventors: Daniel Hoffmeyer, Santa Clara, CA (US); Husam Al-Esawi, El Dorado Hills, CA (US); Tobias Metz, Germering (DE); Til Richardsen, Kirchseeon (DE); Christoph Hollnagel, Gauting (DE)

(73) Assignees: Dionex Softron GmbH, Germering (DE); Dionex Corporation, Sunnyvale, CA (US)

( * ) Notice: Subject to any disclaimer, the term of this patent is extended or adjusted under 35 U.S.C. 154(b) by 1181 days.

(21) Appl. No.: 17/563,151

(22) Filed: Dec. 28, 2021

(65) Prior Publication Data

US 2023/0204610 A1      Jun. 29, 2023

(51) Int. Cl.
| | |
|---|---|
| *G01N 35/00* | (2006.01) |
| *G01N 30/02* | (2006.01) |
| *G01N 35/10* | (2006.01) |

(52) U.S. Cl.
CPC ....... *G01N 35/00732* (2013.01); *G01N 30/02* (2013.01); *G01N 35/1011* (2013.01); *G01N 2030/027* (2013.01); *G01N 2035/00801* (2013.01); *G01N 2035/00831* (2013.01); *G01N 2035/1025* (2013.01)

(58) Field of Classification Search
None
See application file for complete search history.

(56) References Cited

U.S. PATENT DOCUMENTS

| | | | |
|---|---|---|---|
| 7,275,682 | B2 | 10/2007 | Excoffier et al. |
| 8,776,621 | B2 | 7/2014 | Modic et al. |
| 10,520,619 | B2 | 12/2019 | Gerstel |
| 10,598,637 | B2 | 3/2020 | Tolley et al. |
| 2004/0005245 | A1 | 1/2004 | Watson et al. |
| 2006/0014295 | A1 | 1/2006 | Ziegler |
| 2013/0239527 | A1 | 9/2013 | Clarke et al. |
| 2013/0333490 | A1 | 12/2013 | Tanoue |
| 2014/0036276 | A1 | 2/2014 | Gross et al. |
| 2014/0305227 | A1 | 10/2014 | Johns et al. |
| 2016/0266157 | A1 | 9/2016 | Suzuki et al. |
| 2021/0270864 | A1 | 9/2021 | Chiappetta |

FOREIGN PATENT DOCUMENTS

| | | |
|---|---|---|
| JP | 5629801 B2 | 11/2014 |
| JP | 2014-534447 A | 12/2014 |
| JP | 2015-001484 A | 1/2015 |
| JP | 2015040696 A | 3/2015 |
| JP | 2017-072608 A | 4/2017 |

(Continued)

OTHER PUBLICATIONS

"TriPlus RSH Autosampler Integrated Sampling System," 2011-2016, Thermo Scientific Brochure, 8 pages.

(Continued)

*Primary Examiner* — Xiaoyun R Xu

(57) ABSTRACT

Methods and systems are provided for the identification of sample cells in a sample tray that is placed in a chromatography autosampler. A cell gripper and labels are also provided to facilitate such identification.

22 Claims, 5 Drawing Sheets

(56) References Cited

FOREIGN PATENT DOCUMENTS

| | | | |
|---|---|---|---|
| JP | 2018-506351 | A | 3/2018 |
| JP | 2019-506619 | A | 3/2019 |
| JP | 2021-508303 | A | 3/2021 |
| WO | 2021178282 | A1 | 9/2021 |
| WO | 20140162921 | A1 | 9/2021 |

OTHER PUBLICATIONS

Sutherland et al., "An Automated Synthesis-Purification-Sample-Management Platform for the Accelerated Generation of Pharmaceutical Management Platform for the Accelerated Generation of Pharmaceutical Candidates," Journal of Laboratory Automation, Dec. 18, 2013, vol. 19, Issue 2, pp. 176-182.

IDENTIFICATION OF SAMPLE CELLS IN A CHROMATOGRAPHY AUTOSAMPLER

BACKGROUND OF INVENTION

Field of Invention

This application relates, in general, to systems for identifying sample cells in autosamplers, as well as components to faciliate such identification, and methods for their use.

Description of Related Art

When working with autosamplers, users generally must manually apply labels to a vial in accordance with various protocols (e.g., to identify the sample within the vial), and then manually place the vial in a predetermined spot on a sample tray. And considering sample trays may have capacities of 50 or more vials, there is considerable room for error by accidentally loading a vial into a different and incorrect spot. Generally there are little or no chain-of-custody assurances because once the vial is placed into an autosampler, there is no further confirmation from the instrument that the correct vial is in the correct position in a sample tray.

Today's users generally have to manually track where each vial is in a sample tray and where the sample tray goes. For example, a user might manually enter such information into the Chromeleon™ chromatography data system (CDS) or other software platform. Or the user might write such information on piece of paper for later entry. Unfortunately, user error is common, and significant error rates of 20% to 30% are possible.

In some instances, a user may scan labels on the side of a vial bearing sample identification, but the user must still place the vial in its correct position in the sample tray. As this placement is still a manual process, there is still significant room for user error.

In light of the foregoing, it would be beneficial to have systems and methods which overcome the above and other disadvantages of sample identification with known autosamplers.

BRIEF SUMMARY

One aspect of the present invention is directed to a method for identification of sample cells of a sample tray placed in a chromatography autosampler, each sample cell having (i) a container having a side wall, and (ii) a cap having an end surface visible from the sample tray. The method may include: top scanning, with a camera assembly of a machine vision (MV) module of the autosampler, the end surfaces of all the sample cells; and determining, with a computing device, an identity of each of the sample cells within the sample tray based upon the top scanning; wherein the computing device controls the MV module.

Another aspect of the present invention is directed to a method for identification of sample cells of a sample tray placed in a chromatography autosampler, each sample cell having (i) a container having a side wall, and (ii) a cap having an end surface visible from the sample tray. The method may include: gripping, lifting, and rotating, with a cell gripper of the autosampler, each of the sample cells such that each of the sample cells is gripped while in the sample tray, lifted from the sample tray, and rotated above adjacent sample cells of the sample tray; side scanning, with a camera assembly of a machine vision (MV) module of the autosampler, the side walls of each of the sample cells; and returning, with the cell gripper, each of the sample cells to the sample tray.

A further aspect of the present invention is directed to a system for identification of sample cells of a sample tray placed in a chromatography autosampler, each sample cell having (i) a container having a side wall and (ii) a cap having an end surface visible from the sample tray. The system may include: a machine vision (MV) module within the autosampler, the MV module including a camera assembly configured to scan the side walls and/or the end surfaces of the sample cells within the autosampler; and a computing device that controls the MV module, wherein the computing device may be configured to determine an identity of the sample in the sample cell based upon the scanned side walls and/or end surfaces of each sample cell.

Another aspect of the present invention is directed to a cell gripper assembly for a chromatography autosampler configured to grip, lift, and rotate sample cells of a sample tray placed in the autosampler. The cell gripper may include: a jaw assembly configured to selectively grip, lift, and rotate individual samples cells, the jaw assembly including gripper jaws movable between an open position in which the jaw assembly can be positioned about one of the sample cells and a closed position in which the gripper jaws are biased against the one sample cell to grip the one sample cell; a motor assembly configured to rotate the jaw assembly about a motor axis, the motor assembly including a motor body and a hollow motor shaft rotatably supporting the jaw assembly relative to the motor body; and a solenoid assembly configured to move the gripper jaws between the open and closed positions, the solenoid assembly including a plunger extending through the hollow motor shaft and operably connected to the jaw assembly to move the gripper jaws.

And still a further aspect of the present invention is directed to a label for sample identification in a chromatography autosampler, wherein a sample cell contains a sample and may include a container, a cap sealingly engaging the container, and a septum allowing a sample needle to sealingly pass through the cap and access the sample. The label may include: an annular section configured for mounting to a circular end surface of the cap, the annular section including an open center configured for unobstructed access to the septum and preventing contamination by the label of a needle piercing the septum; and a machine-readable end identifier located on the annular section, the end identifier including machine-readable characters; wherein the end identifier is readily visible when the sample cell is located in an open-top sample tray.

Embodiments of the invention may include one or more of the following features.

The sample tray may include a machine-readable tray identifier, and wherein top scanning may include scanning the tray identifier.

The method may further include determining the position of each of the sample cells within the sample tray based upon a unique label affixed to a respective end surface of each sample cell.

The chromatography autosampler may include the computing device.

The method may further include: gripping, lifting, and rotating, with a cell gripper of the autosampler, each of the sample cells such that each of the sample cells is gripped while in the sample tray, lifted from the sample tray, and rotated above adjacent sample cells of the sample tray; side scanning, with the MV module, the side walls of each of the sample cells, with the camera assembly; and returning, with the cell gripper, each of the sample cells to the sample tray.

The rotating may include rotating each of the sample cells about 540°.

The side scanning may include scanning a bar-code label provided on the side wall of each of the sample cells.

The side wall of each sample cell may be translucent or transparent, and wherein the side scanning may include determining (i) a top liquid level within each sample cell, and (ii) a bottom liquid level at a lowermost portion of an inner volume of each sample cell.

The method may further include (i) determining the amount of a sample within each sample cell based upon the top liquid level within a respective sample cell, (ii) adjusting the needle position based upon the top liquid level and the bottom liquid level within a respective sample cell, and/or (iii) limiting an insertion depth of the sample needle based upon a position of the bottom liquid level of a respective sample cell.

The container and/or cap of each sample cell may include an identifying color, and wherein at least one of the top scanning and side scanning may include scanning the identifying color.

The method may further include comparing, with the computing device, the top scanning and the side scanning to determine whether a gripped sample cell is the correct sample cell for further processing. The method may further include aspirating a sample from each of the sample cells with a sampling needle assembly, separating analytes of the sample with a chromatography column, and detecting said analytes of the sample with a chromatography detector.

The method may include top scanning, with the camera assembly of the MV module, the end surfaces of all the sample cells. The method may further include determining, with a computing device, an identity of each of the sample cells within the sample tray based upon the top scanning and/or the side scanning; wherein the computing device also controls the MV module and the cell gripper.

The sample tray may include a machine-readable tray identifier, and wherein top scanning may include scanning the tray identifier.

The method may further include (i) determining the amount of a sample within each sample cell based upon the top liquid level within a respective sample cell, (ii) adjusting the needle position based upon the top liquid level and the bottom liquid level within a respective sample cell, and/or (iii) limiting an insertion depth of the sample needle based upon a position of the bottom liquid level of a respective sample cell.

The container and/or cap of each sample cell may include an identifying color, and wherein at least one of the top scanning and side scanning may include scanning the identifying color.

The method may further include comparing, with the computing device, the top scanning and the side scanning to determine whether a gripped sample cell is the correct sample cell for further processing. The method may further include determining the position of each of the sample cells within the sample tray based upon the unique label of each sample cell. The method may further include aspirating a sample from each of the sample cells with a sampling needle assembly, separating analytes of the sample with a chromatography column, and detecting said analytes of the sample with a chromatography detector.

The camera assembly may further include a horizontally-directed camera configured to scan the side wall of each sample cell. The camera assembly may further include a vertically-directed camera configured to scan the end surfaces of all the sample cells of the sample tray. The camera assembly may further include a horizontally-directed camera configured to scan the side wall of each sample cell and a vertically-directed camera configured to scan the end surfaces of all of the sample cells of the sample tray.

Each sample cell of the sample tray may be provided with a label having an annular section mounted to a respective end surface and/or a side section mounted to a respective side wall, the annular section including (i) a machine-readable end identifier including machine-readable characters and (ii) an open center configured for unobstructed access to a septum in each respective cap, and a side section including a machine-readable side identifier having a bar code.

The system may further include a cell gripper assembly configured to selectively grip, lift, and rotate respective sample cells relative to the sample tray, wherein the computing device also controls the cell gripper, and wherein the computing device may be configured to (i) control the cell gripper to grip, lift, and rotate one of the sample cells above adjacent sample cells of the sample tray, and (ii) control the horizontally-directed camera to scan the side wall of the one sample cell while rotated by the cell gripper.

The cell gripper may further include: a jaw assembly configured to selectively grip, lift, and rotate the one of the samples cells, the jaw assembly including gripper jaws movable between an open position in which the jaw assembly can be positioned about the one of the sample cells and a closed position in which the gripper jaws are biased against the one sample cell to grip the one sample cell; a motor assembly configured to rotate the jaw assembly about a motor axis, the motor assembly including a motor body and a hollow motor shaft rotatably supporting the jaw assembly relative to the motor body; and a solenoid assembly configured to move the gripper jaws between the open and closed positions, the solenoid assembly including a plunger extending through the hollow motor shaft and operably connected to the jaw assembly to move the gripper jaws.

The system may further include a sampling needle assembly for aspirating a sample from each of the sample cells, a chromatography column for separating analytes of the sample, and a chromatography detector for detecting said analytes of the sample.

The gripper jaws may include a cam surface and the plunger has a complementary cam surface, wherein movement of plunger in one direction causes outward movement of the gripper jaws to their respective open positions. The gripper jaws may be biased toward their respective closed positions, wherein movement of the plunger in an opposite direction allows inward movement of the gripper jaws to their respective closed positions.

The cell gripper may further include a lift assembly movably supporting the jaw assembly to lift individual sample cells from the sample tray. The cell gripper may further include a computing device that controls the lift, motor, and solenoid assemblies.

The computing device may be configured with a sample-cell scan sequence in which (i) the jaw assembly is lowered such that gripper jaws are positioned about the one sample cell, (ii) the solenoid assembly affects movement of the gripper jaws to the closed position, (iii) the lift assembly is raised to lift the one sample cell from the sample tray such that the one sample cell is above adjacent sample cells in the sample tray, and (iv) the motor assembly rotates the jaw assembly and the gripped one sample cell about the motor axis.

The lift assembly may be a gantry assembly movably supporting the jaw assembly to move along X, Y and Z axes, and the computing device controls the gantry assembly.

The computing device may be configured with a sample-cell scan sequence that may include (i) positioning the gantry assembly above the one sample cell, (ii) moving the gripper jaws to the open position, (iii) lowering the gantry assembly such that gripper jaws are positioned about the one sample cell, (iv) moving the gripper jaws to the closed position, (v) raising the gantry assembly to lift the one sample cell from the sample tray such that the one sample cell is above adjacent sample cells in the sample tray, and (vi) rotating the jaw assembly and the gripped one sample cell about the motor axis to allow side scanning of the one sample cell.

The label may further include a side section configured for mounting to a portion of the outer surface of the container, the side section including a machine-readable side identifier, the side identifier including a bar code. The label may further include a tether interconnecting the annular section and the side section, wherein the tether provides tamper-proof indication that the cap and the container remain together so long as the tether interconnects the annular section mounted to the cap and the side section mounted to the container.

The container may be a vial and the cap may be a snap cap, and wherein the side section and the annular section are configured for mounting to the vial and snap cap, respectively.

The tether has a length configured to allow the snap cap to be removed from the vial without tearing the annular section from the side section.

A sheet may include a plurality of the above labels. Each of said plurality of labels may include an adhesive layer and a removable release liner mounted to the sheet, wherein each of said plurality of labels has a unique end identifier, and wherein each of said plurality of labels may be configured for individual removal from the sheet and mounting to the circular end surface of the cap.

The systems and methods of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A and FIG. 5B are elevational views of labels that may be utilized with the system of FIG. 1, in which FIG. 5A shows a sheet of labels in an unapplied state and FIG. 5B shows a label applied to a sample cell.

FIG. 6A and FIG. 6B are side views of the label and sample cell of FIG. 5B, with FIG. 6A illustrating liquid level detection by scanning of a concave meniscus of sample within the sample cell, and FIG. 6B illustrating liquid level detection by scanning of a convex meniscus of sample within the sample cell.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention(s) described herein.

Autosamplers play a vital role in chromatography systems as they hold and manage multiple samples that will undergo analysis by the system. The increasing prevalence and capabilities of charge-coupled devices (CCD) have opened the door for many applications to utilize machine vision (MV) in providing imaging-based automatic inspection and analysis. Utilizing machine vision within automated sample handling devices offers various advantages and unique solutions that may automate identification of sample cells (and the samples therein) and provide other quality assurances during automated sample-handling processes.

For example, machine vision may be used to recognize a variety of barcodes, characters, colors, landmarks, shapes, and/or other unique identifies used to identify a sample within a sample cell, which may eliminate the manual step traditionally performed by a user to link a specific sample to a prescribed chromatography method or protocol. Automating this step with machine vision may facilitate ease of use, especially for a user dealing with higher volumes of samples. And machine vision may also provide a means to identify the sample tray, which may be configured to provide data such as the type of vial (e.g., holding a sample vs. holding standards), the volume of the vial, the total number of vials that may be loaded into the tray, and/or tray location.

To prevent mismatches between user or lab-protocol and sample inventory inside the instrument, machine vision may be utilized to provide confirmation that the correct sample is being handled and/or drawn. Also, machine vision may be utilized to scan unique identifiers provided on the end surfaces of the sample cells that are visible from the sample tray while the cells are located in the sample tray, which identifiers may then be processed by a computing device. To improve reliability and performance machine vision may also be utilized in accordance with various aspects of the present invention to determine liquid level and volume tracking within sample cells.

Figure 1:
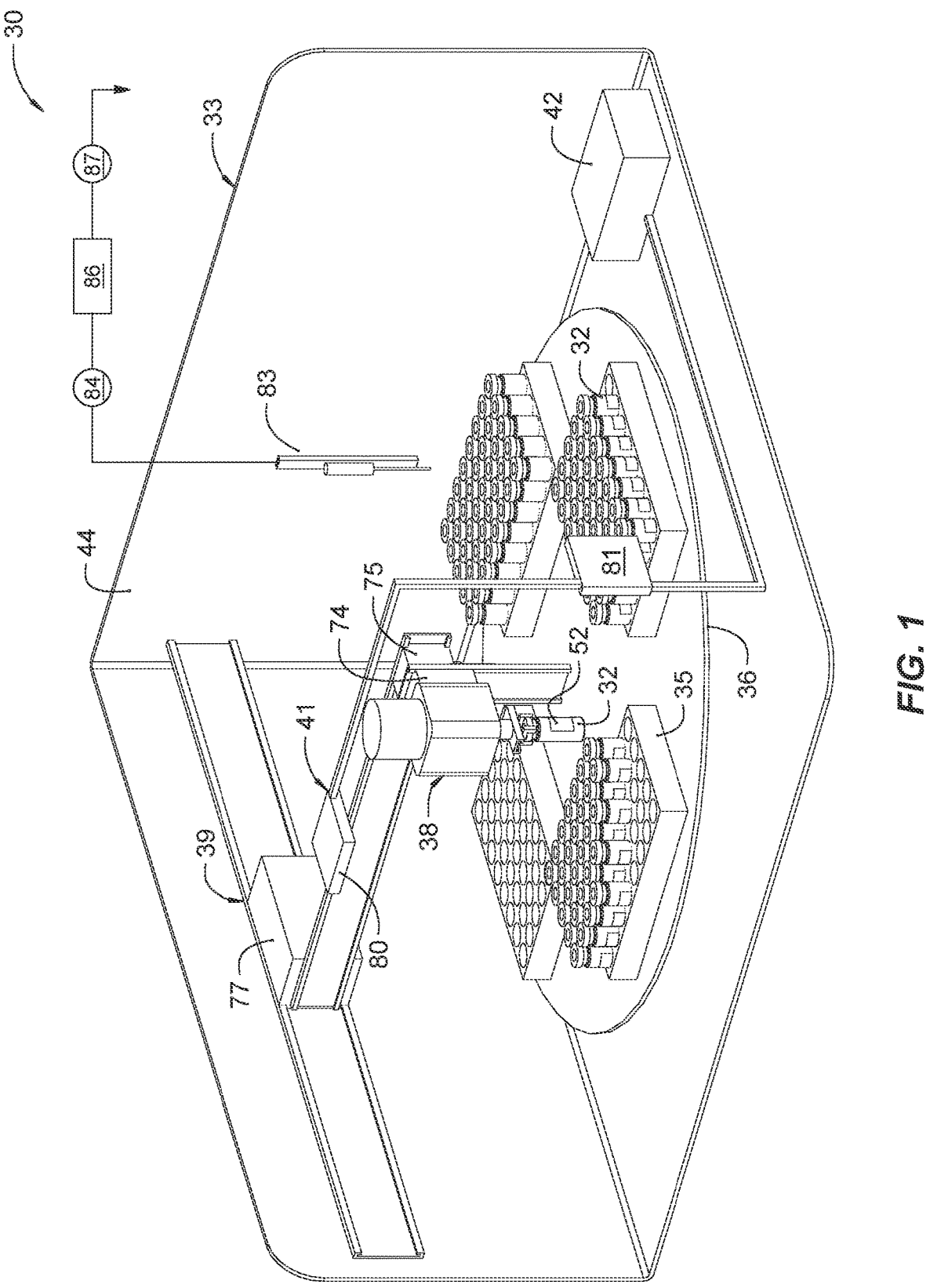
FIG. 1 is a perspective view of an exemplary system for identification of sample cells in a chromatography autosampler in accordance with various aspects of the present invention.

Turning now to the drawings, wherein like components are designated by like reference numerals throughout the various figures, attention is directed to FIG. 1 which shows an exemplary system 30 for identification of sample cells 32 loaded in a chromatography autosampler 33 in accordance with various aspects of the present invention. A plurality of sample cells is loaded onto a sample tray 35, which is in turn loaded into the autosampler. The autosampler generally includes a carousel 36 or other tray support, a cell gripper assembly 38 for individually handling the sample cells, a gantry 39 to maneuver the cell gripper assembly, a machine vision (MV) module 41 for scanning the end surfaces and/or sides of the sample cells, and a computing device 42 for controlling the carousel, the cell gripper, the gantry, and the MV module. A housing 44 may be provided to enclose the above components in an otherwise conventional manner. Although only a portion of the housing is shown, one will appreciate that it may fully enclose the components of the autosampler with suitable portals for loading sample trays onto the carousel.

As shown in FIG. 1, the autosampler 33 includes carousel 36 upon which multiple sample trays 35 may be loaded. While the lower right sample tray is shown fully loaded with sample cells, the lower left sample tray 35 has some empty positions for simplified illustration, and the upper sample trays are shown empty for simplified illustration. One will appreciate that all sample trays may be fully loaded with sample cells in order to maximize throughput of the autosampler.

One will also appreciate that the sample trays may have various dimensions and configurations. For example, the illustrated sample trays are dimensioned and configured to hold a 5×8 array of 2 mL containers. One will appreciate that the sample trays may be configured to hold fewer or more sample cells (e.g., 21, 54, 64, 96, 100, or more), and they may be configured to hold smaller or larger sample cells (e.g., 0.5 mL, 0.7 mL, 10 mL, 20 mL, or more).

Figures 5A, 5B, 6A, 6B:
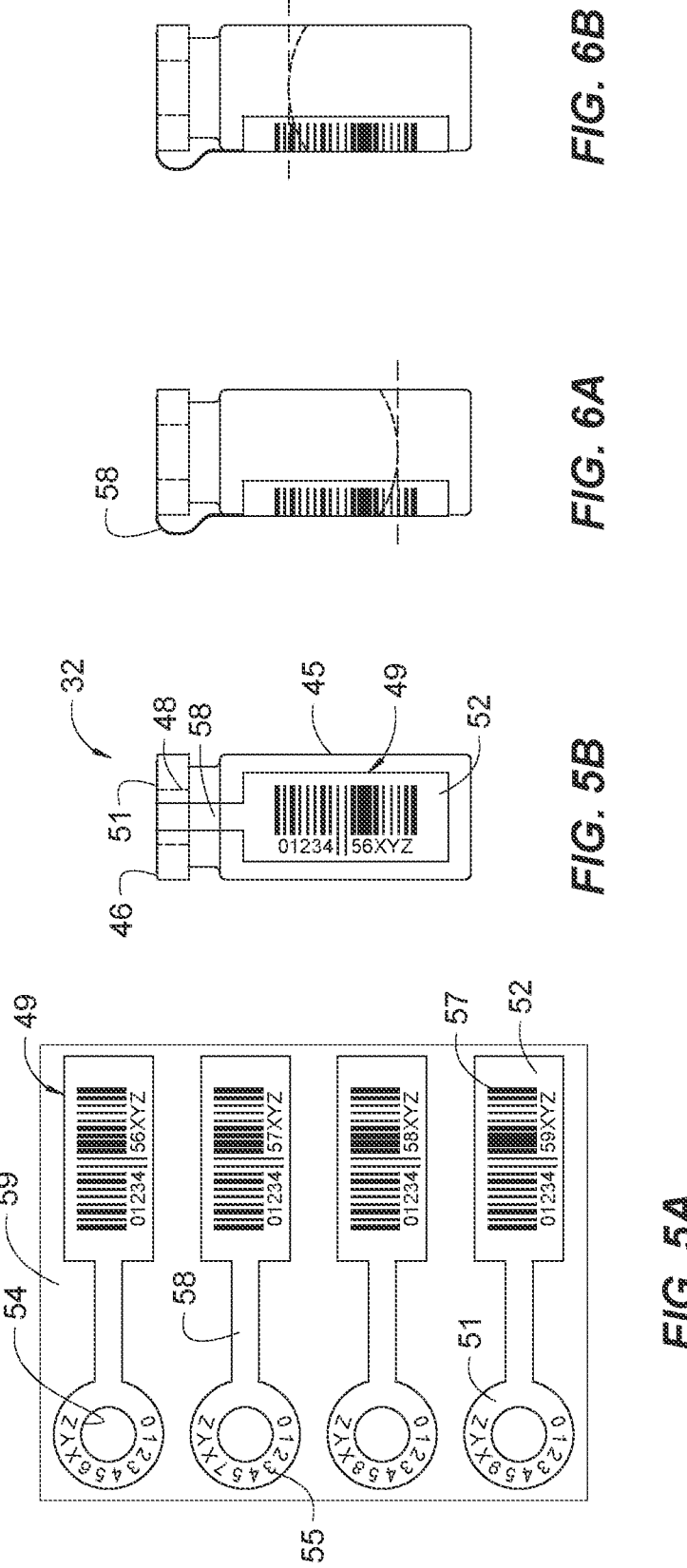

With reference to FIG. 5B, each sample cell 32 generally includes a container having a side wall 45, a cap having an annular end surface 46 that sealingly engages the container, and a pierceable septum 48 (shown with hidden lines) allowing a needle to sealingly pass through the cap and access a sample within the container. For example, the container may be a vial and the cap a snap cap, or they may be other suitable sample containers.

With referenced to FIG. 5A, each sample cell may be provided with a label 49 having an annular section 51 mounted to a respective end surface of the cap, and a side section 52 mounted to the outer surface of a respective side wall. The annular section includes an open center 54 configured for unobstructed access to a respective septum, thus reducing the possibility of chemical interference due to inadvertent contact between a sample needle and the label.

The annular section may include a machine-readable end identifier 55 having machine-readable characters. For example, the end section may include alphanumeric characters or other suitable graphics that can be digitally captured, translated, and/or otherwise processed. The side section may include a machine-readable side identifier 57 having machine-readable indicia or characters. For example, the side identifier may include alphanumeric characters, a bar code and or other suitable graphics which can be digitally captured, translated, and/or otherwise processed. For example, the alphanumeric characters may be processed by optical character recognition (OCR).

A tether 58 may be provided to interconnect annular section 51 and side section 52 of the label. Such a tether provides tamper-proof indication that a respective cap and container remain together so long as the tether remains untorn and interconnects the annular section 51 mounted to the cap and the side section 52 mounted to the container. In various embodiments, the tether may have a length that is dimensioned and configured to allow a snap cap to be removed from a vial without tearing the annular section from the side section. Such configuration ensures that the snap cap and the vial remain paired and have not been inadvertently used with other caps and vials, which may thus reduce the chance of cross-contamination.

Advantageously, end identifier 55 is readily visible when the sample cell is located in an open-top sample tray whereby the end identifier may be readily scanned from above, alone or together with other sample cells located in the sample tray.

One will appreciate that a sheet 59 may be provided including a plurality of labels, as shown in FIG. 5A. Although the exemplary sheet only includes four labels, one will appreciate that a sheet may include one, two, three, or many more labels. The labels may have an adhesive layer and a removable release liner mounted to the sheet in an otherwise conventional manner. Each label may have unique preprinted end identifiers and/or side identifiers. However, one will appreciate that the identifiers may be provided or created using a chromatography data system (CDS) or other software platform, and the identifiers may then be printed on blank label sheets using a dedicated or networked printer.

Carousel 36 may rotate sample tray 35 to and from a load position adjacent cell gripper 38, for example, to and from the lower left tray position shown in FIG. 1. The cell gripper may be configured to selectively grip, lift, and rotate respective sample cells 32 about a vertical axis A (shown in FIG. 2F) relative to the sample tray such that the side label 49 can be readily scanned.

Figures 3A, 3B, 4:
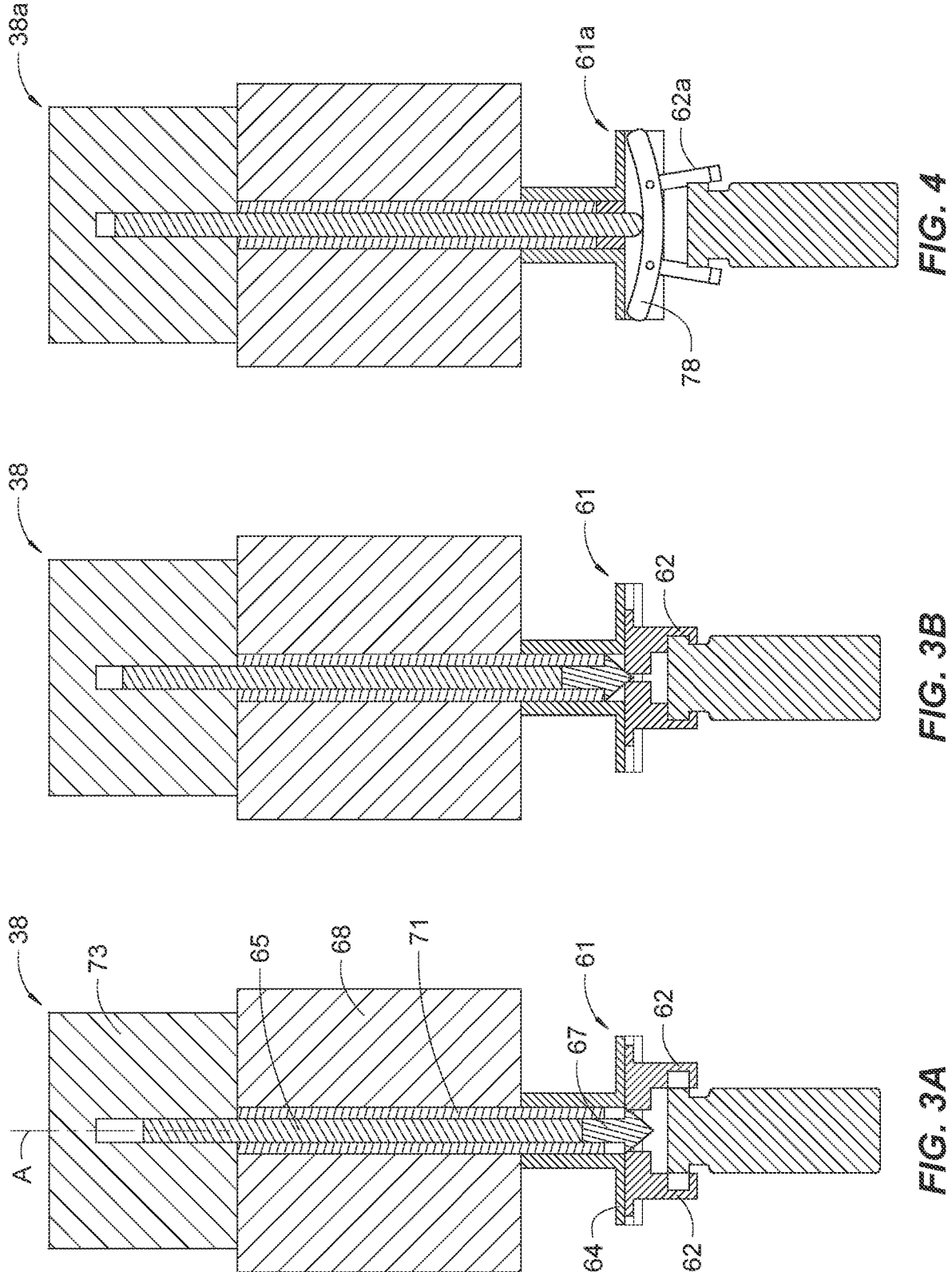
FIG. 3A and FIG. 3B are cross-sectional elevational views of the cell gripper of the system of FIG. 1, with FIG. 3A showing the cell gripper in an open released position and FIG. 3A showing the cell gripper in a closed gripping position.
FIG. 4 is a cross-sectional elevational view of another cell gripper usable with the system of FIG. 1, with the cell gripper in an open released position.

In various embodiments, and with reference to FIG. 3A and FIG. 3B, the cell gripper includes a jaw assembly 61 configured to selectively grip, lift, and rotate the one of the samples cells. The jaw assembly includes gripper jaws 62 movable between an open position in which the jaw assembly can be positioned about the one of the sample cells (see FIG. 2C and FIG. 3A) and a closed position in which the gripper jaws are biased against the one sample cell to grip the one sample cell (see FIG. 2D and FIG. 3B).

In the illustrated embodiment, gripper jaws 62 are horizontally slidable within a gripper head 64 and are biased toward a closed position (see FIG. 3B). One will appreciate that the gripper jaws may be biased toward the closed position by a compression spring or other suitable biasing means. The gripper jaws have an inner cam surface against which a plunger 65 drives a cam 67 having a complementary cam surface. As the plunger drives cam 67 downward, the cam's complementary cam surfaces drive jaws 62 outward to open the gripper assembly (see FIG. 3A). Upward movement of the plunger and cam allow the gripper jaws to spring back to their closed position. In other words, upward movement of the plunger in the opposite direction effects inward movement of the gripper jaws to their respective closed positions.

Figures 2A, 2B, 2C, 2D, 2E, 2F:
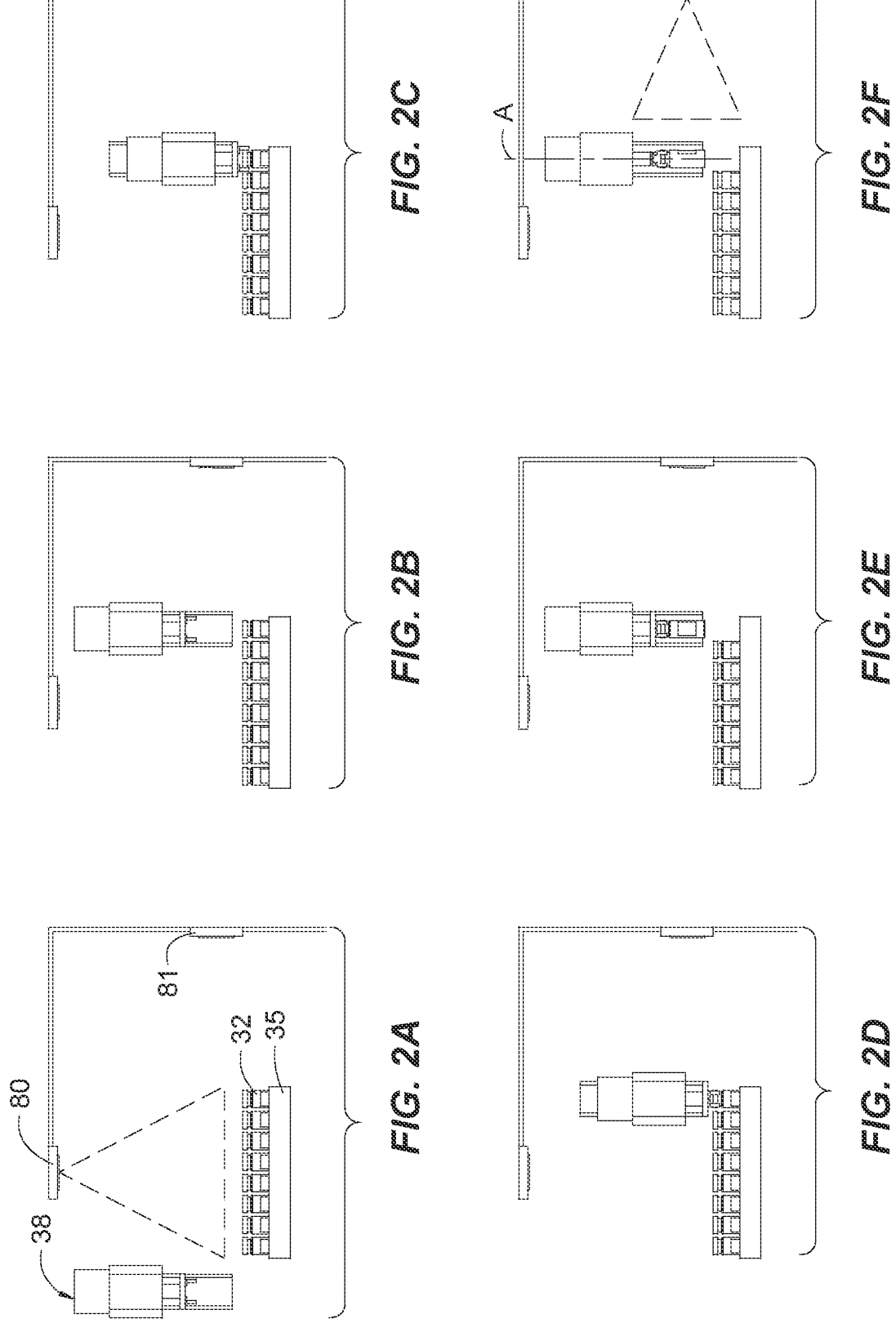
FIG. 2A, FIG. 2B, FIG. 2C, FIG. 2D, FIG. 2E, and FIG. 2F are a series of elevational views illustrating the orientation of a sample tray, cell gripper, and cameras during a series of exemplary steps utilized by the system of FIG. 1.

A motor assembly 68 is configured to rotate the jaw assembly about an axis A (see FIG. 2F). The motor assembly includes a motor body 70 and a hollow motor shaft 71 rotatably supporting the jaw assembly relative to the motor body. One will appreciate that the motor assembly 68 may be a stepper motor or other suitable motor, provided it is configured with a hollow motor shaft that allows a plunger to extend through the motor and control the gripper assembly while allowing rotation of the gripper assembly.

A solenoid assembly 73 is configured to move the gripper jaws between their open and closed positions. The solenoid assembly selectively moves plunger 65 up and down extending through the hollow motor shaft 71 to operate the jaw assembly by moving cam 67 against gripper jaws 62 to selectively move the jaws between their open and closed positions. One will appreciate that various solenoid assemblies may be utilized, such as the Ledex Brand low-profile linear solenoids by Johnson Electric. And one will appreciate that the assembly may be a one-way linear actuator, a two-way linear actuator, or a stepped linear actuator.

With reference to FIG. 1, a lift assembly movably supports the jaw assembly to lift individual sample cells from the sample tray. In various embodiments, the lift assembly is gantry assembly 39 that is configured to move the jaw assembly along X, Y and Z axes. For example, a Z-axis actuator 74 moves the jaw assembly up and down along a Z-axis track, a Y-axis actuator 75 effects movement left and right along a corresponding Y-axis track, and an X-axis actuator 77 effects movement back-and-forth along a corresponding X-axis track. One will appreciate, however, that the lift assembly may include one-dimensional actuators (e.g., up-and-down), two-dimensional actuators (e.g., up-and-down and another axis of motion), and/or other suitable transport mechanisms.

One will appreciate that various gripper assemblies could be utilized in accordance with various aspects of the present invention. For example, gripper assembly 38a may include pivoting gripper fingers 62a configured to grip the cap and/or neck of the vial (see FIG. 4). Such pivoting gripper fingers may be biased toward their closed position by a leaf spring 78 whereby plunger 65a may be actuated to overcome the biasing effect of the leaf spring to pivot the gripper fingers to their open positions (see FIG. 4). Alternatively, a magnetic gripper assembly could be utilized such as those used by the TriPlus™ 500 Headspace Sampler by ThermoFisher Scientific.

The MV module is provided with cameras and/or other digital imaging devices configured to scan and digitally image the side walls and/or the annular end surfaces of the sample cells within the autosampler. For example, the MV module may include a vertically-directed top camera 80 configured to scan the annular end surfaces of the sample cells, and a horizontally-directed side camera 81 configured to scan the side wall of each sample cell. One will appreciate that various cameras may be utilized including, but not limited, to the Advantage 100 series OEM smart cameras and the AE2 Advantage image engines, both by the Cognex Corporation, as well as other suitable digital imaging devices.

The top camera may be vertically directed downward such that it can capture in image of one or more sample cells 32 located in sample tray 35 (see FIG. 2A). One will appreciate that the cell gripper may be moved to one side of the sample tray to facilitate capturing an unobstructed view of all sample cells located in the sample tray. The top camera maybe located above the cell gripper as shown, however, one will appreciate that a "top" camera or device may be mounted on the cell gripper such that individual sample cells can be scanned while the cell gripper is aligned over each cell.

The side camera may be horizontally directed from one side of the autosampler such that it can capture an image of a sample cell 32 as it is supported and rotated by cell gripper 38 about axis A (see FIG. 2F). In various embodiments, the camera may capture a continuous image of the entire circumference of side wall 45 (shown in FIG. 5B) as the sample cell is rotated. One will appreciate that the side camera may also be configured to capture a static image of the sample cell when the side label is aligned toward the side camera, or a circumferential portion of the side wall (e.g., about 180°). However, a continuous scanned image of the entire side wall has certain advantages as will become evident below.

Autosampler 33 may include a sampling needle assembly 83 that is fluidly connected to other components of a chromatography system in order to analyze constituents of the samples within the sample cells. For example, system 30 may be a chromatography system including the autosampler along with a sample injection valve 84 to introduce samples to a downstream HPLC or ion chromatography column 86 and, in turn, a conductively or other suitable detector 87. The column and detector may thus separate and detect analytes of interest within the samples contained within each of the sample cells.

Turning now to computing device 42, the computing device may have a number of components. In some embodiments, some or all of the components included in the computing device may be attached to one or more motherboards and enclosed in a housing (e.g., including plastic, metal, and/or other materials). In some embodiments, some of these components may be fabricated onto a single system-on-a-chip (SoC) that may include one or more processing devices and one or more storage devices. Additionally, in various embodiments, the computing device may include interface circuitry for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device may include display device interface circuitry (e.g., a connector and driver circuitry) to which a display device may be coupled.

The computing device may include one or more processing devices. As used herein, the term "processing device" may refer to any device or portion of a device that processes electronic data from registers and/or memory to transform that electronic data into other electronic data that may be stored in registers and/or memory. The processing device(s) may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device may include one or more storage devices. The storage device may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device may include memory that shares a die with a processing device. In such an embodiment, the memory may be used as cache memory and may include embedded dynamic random access memory (eDRAM) or spin transfer torque magnetic random access memory (STT-MRAM), for example. In some embodiments, the storage device may include non-transitory computer readable media having instructions thereon that, when executed by one or more processing devices, cause the computing device to perform any appropriate ones of or portions of the methods disclosed herein.

One will also appreciate that the computing device may include one or more logic elements. As used herein, the term "logic" may include an apparatus that is to perform a set of operations associated with the logic. For example, any of the logic elements may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

Computing device 42 may be configured to control various components of the autosampler including the carousel, cell gripper, gantry, and MV module. The computing device may either be integrated into the autosampler itself, integrated into the chromatography system, or be part of a personal computer (PC) that sends signals to communicate with and control the autosampler or the system. The memory portion can include software or firmware instructions on how to control the various components. For example, the computing device may be configured to run the Chromeleon™ chromatography data system (CDS) or other software platform, or configured to communicate with a PC that does so.

The computing device may operate cell gripper 38 and gantry 39 to grip, lift, and rotate individual sample cells 32 above adjacent sample cells in sample tray 35. The computing device may also operate the MV module to control the vertically-directed top camera to scan the annular end surfaces of all sample cells positioned in the sample tray, and control the horizontally-directed side camera to scan the side wall of individual sample cells while rotated by the cell gripper. By processing images of the label's (i) annular section 51 captured by the top camera and (ii) side section 52 captured by the side camera, the computing device may determine the identity of the sample in the sample cell and the position of each sample cell within the sample tray based upon the scanned annular end surfaces and/or side walls of each sample cell.

In accordance with various aspects of the present invention, the computing device maybe configured with a sample-cell scan sequence in which the jaw assembly is moved to the side of the sample tray (FIG. 2A), the jaw assembly is then positioned above a sample cell (FIG. 2B), the jaw assembly is then lowered such that gripper jaws are positioned about the sample cell (FIG. 2C), the solenoid assembly then moves the gripper jaws to the closed position (FIG. 2D), the lift assembly is then raised to lift the sample cell from the sample tray such that the sample cell is above adjacent sample cells in the sample tray (FIG. 2E), and the motor assembly then rotates the jaw assembly and the gripped one sample cell about the motor axis allowing the side camera to capture an image of sample cell's side wall (FIG. 2F). This process may then be repeated until all sample cells in the sample tray are similarly scanned, and again repeated until sample cells of all sample trays are processed.

One exemplary method of identifying sample cells in accordance with various aspects of the present invention can now be described. A user attaches labels to individual sample cells containing samples, loads the sample cells into a sample tray, and loads the sample cell into an autosampler. In various embodiments, a top camera may confirm an identifier on the sample tray before the scanning process begins. The top camera scans the end surfaces of all sample cells visible from above the sample tray, individually or simultaneously, and the computing device registers the position of each sample cell within the particular sample tray. The gripper lifts the individual sample cells and presents their side label to a side camera. The gripper rotates the sample cell to present the full label (and/or full side wall) of the sample cell to the side camera. And the gripper returns the sample cell to its sample tray location. The sample cell (and sample within) is now physically registered with a position within a sample tray and may thus be tracked by the computing device.

In various embodiments, the gripper is configured to rotate the sample cell approximately 360° in order to scan the circumference of the sample cell and fully capture an image of any label affixed thereto. And in various embodiments, the gripper is configured to rotate the sample cell approximately 540°, 720°, or more in order to account for latency times of readers.

Scanning the full side wall of the sample cell not only allows identification and tracking, such scanning may allow for identification of specific vial sizes, determination of sample needle positions within the sample cell, determination of liquid levels within the sample cell (see, e.g., FIG. 6A and FIG. 6B), calculation of liquid amounts level based on various parameters (e.g. type of vial, type of liquid, size/volume of vial, height of liquid surface in vial, etc.). Scanning the full side wall of the sample cell may be done to allow for distinguishing between concave meniscus and convex meniscus and determine the corresponding liquid level (see, e.g., FIG. 6A and FIG. 6B).

Figure 7:
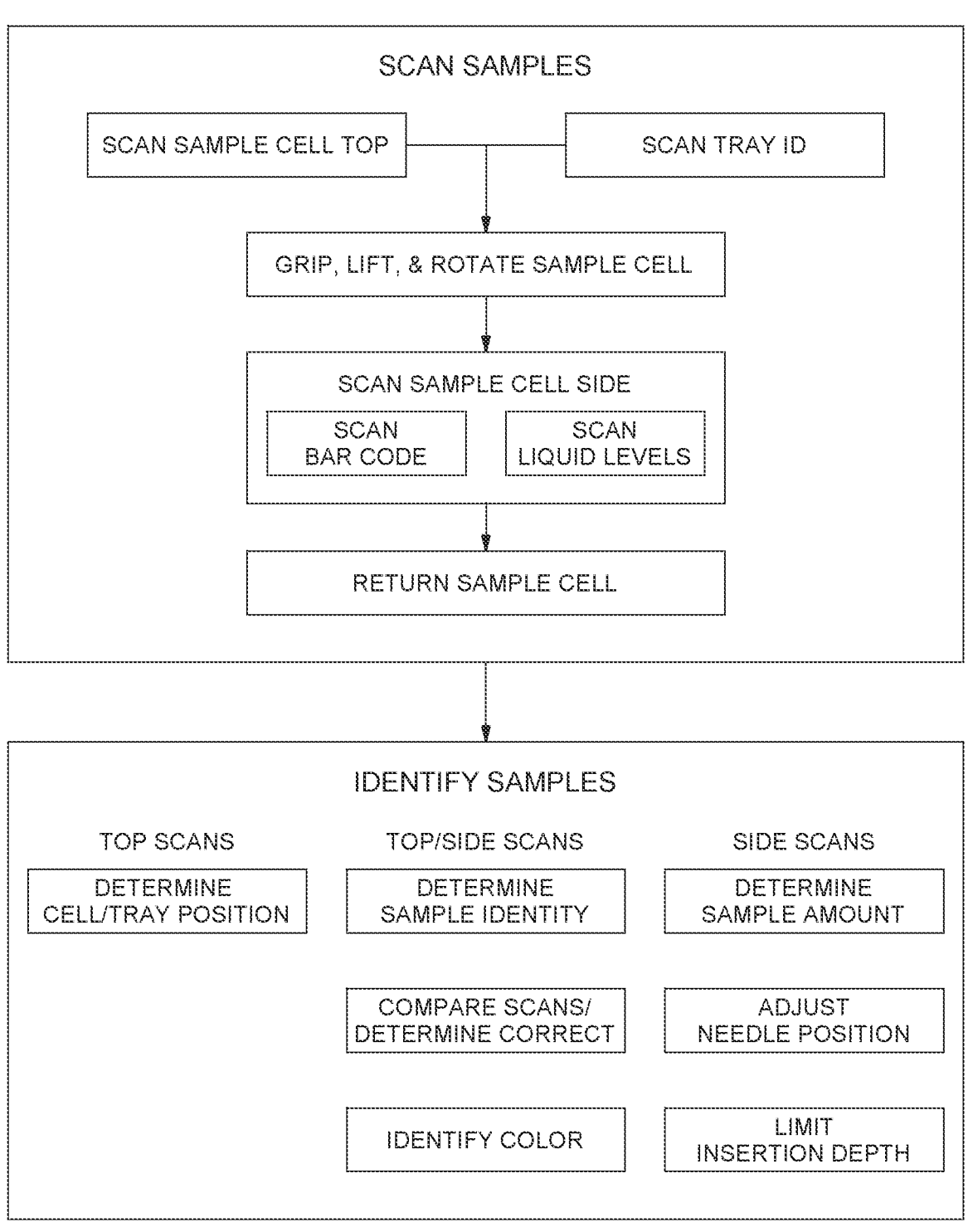
FIG. 7 is a block diagram of an exemplary method for identification of sample cells in chromatography autosampler in accordance with various aspects of the present invention

With reference to FIG. 7, another of exemplary method of identifying sample cells (and samples therein) in accordance with the present invention can now be described. Once a set of sample cells containing sample have been individually labeled with unique identifiers loaded into a sample tray, and then loaded into an autosampler, the sample cells are scanned with a machine vision (MV) module of the autosampler. The annular end surfaces of all the sample cells are scanned by a top camera, during which a tray identifier of the sample tray may also be scanned by the top camera.

Each individual sample cell of the sample tray is gripped, lifted, and rotated with a cell gripper of the autosampler. In particular, each of the sample cells is gripped while in the sample tray, lifted from the sample tray, and rotated above adjacent sample cells of the sample tray.

Each individual sample cell is scanned by a side camera of the MV module in which the side wall of each sample cell is canned by the side camera. The scanning may include the scanning of alphanumeric characters and/or a bar code provided on the side wall of each of the sample cells.

Preferably each sample cell is rotated about 360° to ensure the entire circumference of the side wall is scanned.

Each individual sample cell is then returned to the sample tray by the cell gripper, and the process repeated until all sample cells are similarly scanned. The computing device then identifies the samples within each sample cell and its position within the sample tray based upon the top scanning and/or the side scanning.

In various embodiments, the side wall of each sample cell is translucent or transparent to allow digital imaging of the liquid and its level within the sample cell. The side scanning may include scanning the full side wall surface of the sample cell allowing the computing device to process the scanned image(s) and determine a top liquid level within each sample cell, and a bottom liquid level at a lowermost portion of an inner volume of each sample cell. And in various embodiments, the computing device processes the scanned image(s) and determines the amount of a sample within each sample cell based upon the top liquid level within a respective sample cell. The computing device may also adjust sample needle positions during sample draw based upon the top liquid level and the bottom liquid level within a respective sample cell. And the computing device may limit an insertion depth of the sample needle during sample draw based upon a position of the bottom liquid level of a respective sample cell, which bottom liquid level would be indicative of the inner bottom surface of the sample cell or potential foreign objects within the sample cell that may damage the sample needle.

In various embodiments, the container and/or cap of each sample cell may include identifying colors. In such cases, the top scanning and/or the side scanning may capture color images and allow the computing device to identify various parameters of the sample cell and/or sample therein based upon such identifying colors. For example, one color may be utilized to identify sample sells containing standards as opposed to samples.

Advantageously, side and top scanning of the sample cells in accordance with various aspects of the present invention obviates the need for a user to manually map the various sample cells within a corresponding sample tray. Since labels provided on the sample cells include unique identifiers, the sample identification may be known regardless of where the user places it in the sample tray.

For convenience in explanation and accurate definition in the appended claims, the terms "up" or "upper", "down" or "lower", "left" and "right" are used to describe features of the exemplary embodiments with reference to the positions of such features as displayed in the figures.

In many respects, various modified features of the various figures resemble those of preceding features and the same reference numerals followed by subscript "a" designate corresponding parts.

The foregoing descriptions of specific exemplary embodiments of the present invention(s) have been presented for purposes of illustration and description. They are not intended to be exhaustive or to limit the invention(s) to the precise forms disclosed, and obviously many modifications and variations are possible in light of the above teachings. The exemplary embodiments were chosen and described in order to explain certain principles of the invention(s) and their practical application, to thereby enable others skilled in the art to make and utilize various exemplary embodiments of the present invention(s), as well as various alternatives and modifications thereof.

What is claimed is:

1. A method for identification of sample cells of a sample tray placed in a chromatography autosampler, each sample cell having (i) a container having a translucent or transparent side wall, and (ii) a cap having an end surface visible from the sample tray, the method comprising:
    top scanning, with a camera assembly of a machine vision (MV) module of the autosampler, the end surfaces of all the sample cells;
    gripping, lifting, and rotating, with a cell gripper of the autosampler, each of the sample cells such that each of the sample cells is gripped while in the sample tray, lifted from the sample tray, and rotated above adjacent sample cells of the sample tray;
    side scanning, with the MV module, the side walls of each of the sample cells, with the camera assembly; returning, with the cell gripper, each of the sample cells to the sample tray; determining, with a computing device, an identity of each of the sample cells within the sample tray based upon the top scanning;
    determining a bottom liquid level at a lowermost portion of an inner volume of each sample cell;
    identifying an inner bottom surface of the sample cell and a foreign object within the sample cell, and
    controlling the sampling needle assembly and limiting the insertion depth of a sample needle of the sampling needle assembly based on a position of the bottom liquid level, the bottom surface, and the foreign object of a respective sample cell to avoid damaging the sample needle,
    wherein the computing device controls the MV module.

2. The method according to claim 1, wherein the sample tray includes a machine-readable tray identifier, and wherein top scanning includes scanning the tray identifier.

3. The method according to claim 1, further comprising determining the position of each of the sample cells within the sample tray based upon a unique label affixed to a respective end surface of each sample cell.

4. The method according to claim 1, wherein the chromatography autosampler comprises the computing device.

5. The method according to claim 1, wherein the rotating includes rotating each of the sample cells about 540.

6. The method according to claim 1, wherein the side scanning includes scanning a bar-code label provided on the side wall of each of the sample cells.

7. The method according to claim 1, wherein the side scanning includes determining a top liquid level within each sample cell.

8. The method according to claim 7, wherein the method further comprises determining the amount of a sample within each sample cell based upon the top liquid level within a respective sample cell, and adjusting the needle position based upon the top liquid level and the bottom liquid level within a respective sample cell.

9. The method according to claim 1, wherein the container and/or cap of each sample cell includes an identifying color, and wherein at least one of the top scanning and side scanning includes scanning the identifying color.

10. The method according to claim 1, the method further comprising comparing, with the computing device, the top scanning and the side scanning to determine whether a gripped sample cell is the correct sample cell for further processing.

11. The method according to claim 1, the method further comprising aspirating a sample from each of the sample cells with a sampling needle assembly, separating analytes of the sample with a chromatography column, and detecting said analytes of the sample with a chromatography detector.

12. A method for identification of sample cells of a sample tray placed in a chromatography autosampler, each sample cell having (i) a container having a translucent or transparent side wall, and (ii) a cap having an end surface visible from the sample tray, the method comprising:

gripping, lifting, and rotating, with a cell gripper of the autosampler, each of the sample cells such that each of the sample cells is gripped while in the sample tray, lifted from the sample tray, and rotated above adjacent sample cells of the sample tray;

side scanning, with a camera assembly of a machine vision (MV) module of the autosampler, the side walls of each of the sample cells;

determining a bottom liquid level at a lowermost portion of an inner volume of each sample cell;

identifying an inner bottom surface of the sample cell and a foreign object within the sample cell and returning, with the cell gripper, each of the sample cells to the sample tray; and controlling the sampling needle assembly and limiting the insertion depth of a sample needle of the sampling needle assembly based on a position of the bottom liquid level, the bottom surface, and the foreign object of a respective sample cell to avoid damaging the sample needle.

13. The method according to claim 12, further comprising:

determining, with a computing device, an identity of each of the sample cells within the sample tray based upon he side scanning;

wherein the computing device also controls the MV module and the cell gripper.

14. The method according to claim 13, wherein the chromatography autosampler comprises the computing device.

15. The method according to claim 12, wherein the sample tray includes a machine-readable tray identifier, and the method further comprising scanning the tray identifier with the camera assembly of the MV module.

16. The method according to claim 12, wherein the rotating includes rotating each of the sample cells about 5400.

17. The method according to claim 12, wherein the side scanning includes scanning a bar-code label provided on the side wall of each of the sample cells.

18. The method according to claim 12, wherein the side wall of each sample cell is translucent or transparent, and wherein the side scanning includes determining (i) a top liquid level within each sample cell, and (ii) a bottom liquid level at a lowermost portion of an inner volume of each sample cell.

19. The method according to claim 18, wherein the method further comprises (i) determining the amount of a sample within each sample cell based upon the top liquid level within a respective sample cell, (ii) adjusting the needle position based upon the top liquid level and the bottom liquid level within a respective sample cell, and/or (iii) limiting an insertion depth of the sample needle based upon a position of the bottom liquid level of a respective sample cell.

20. The method according to claim 13, the method further comprising comparing, with the computing device, the side scanning to determine whether a gripped sample cell is the correct sample cell for further processing.

21. The method according to claim 12, the method further comprising determining the position of each of the sample cells within the sample tray based upon the unique label of each sample cell.

22. The method according to claim 12, the method further comprising aspirating a sample from each of the sample cells with a sampling needle assembly, separating analytes of the sample with a chromatography column, and detecting said analytes of the sample with a chromatography detector.

* * * * *